United States Patent Office.

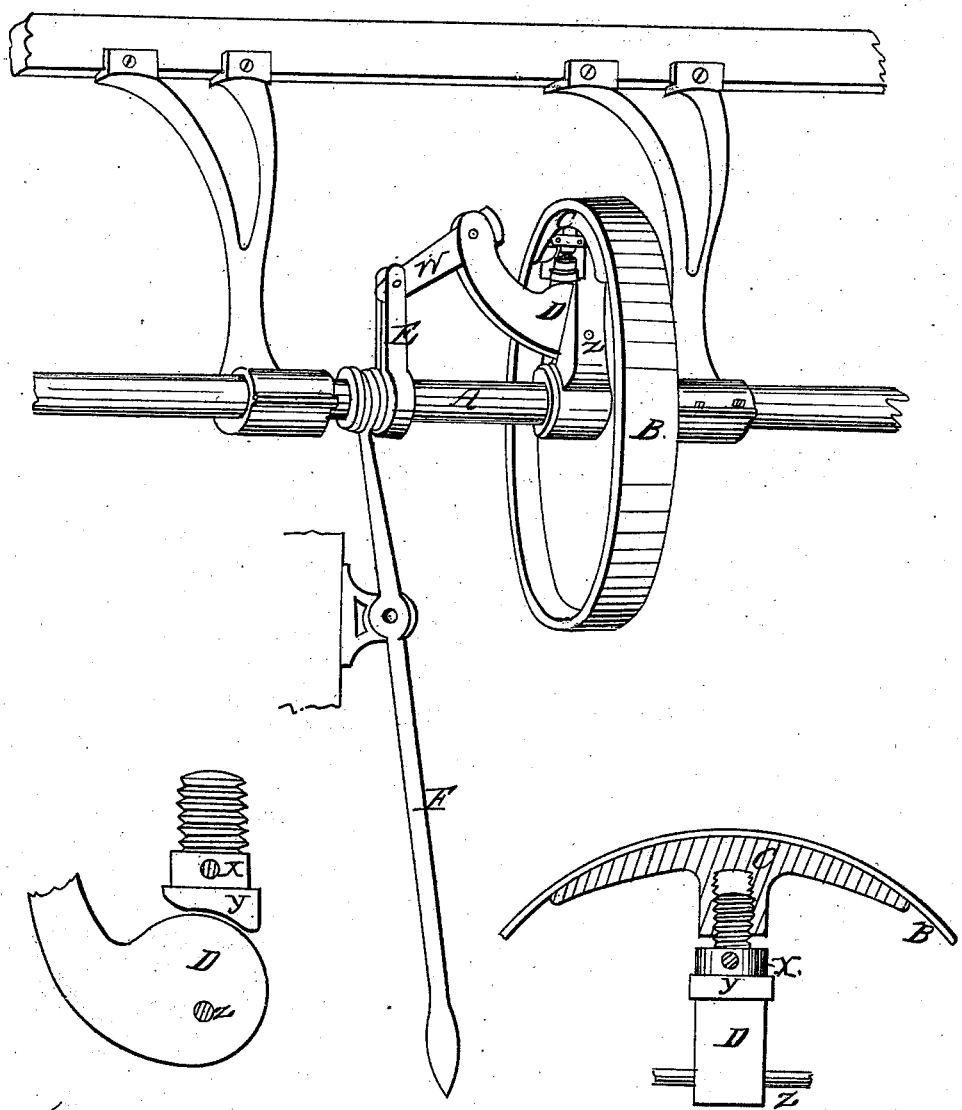

CHARLES WRIGHT, OF NEWARK, NEW JERSEY.

*Letters Patent No. 80,045, dated July 14, 1868; antedated July 10, 1868.*

IMPROVEMENT IN FRICTION-CLUTCH PULLEY.

*The Schedule referred to in these Letters Patent and making part of the same.*

TO ALL WHOM IT MAY CONCERN:

Be it known that I, CHARLES WRIGHT, of the city of Newark, in the county of Essex, and State of New Jersey, have invented certain Improvements in Friction-Clutch Pulleys; and I do hereby declare the following to be a full and exact description of the same, reference being herein had to the drawings that accompany this specification, making part of the same.

The nature of my improvement consists in the peculiar construction of the lever-attachments, and in the provision for adjustment to insure tightness.

In the drawings—

Figure 1 is a perspective view of the clutch and the pulley.

Figure 2 is a side view of the eccentric, eccentric-block, and screw.

Figure 3, a back view of the eccentric, eccentric-block, set-screw, and friction-piece in position in the interior of a pulley.

A is the shaft, that is in two lengths, their ends meeting in the middle of the hub of the pulley B, to one of which ends the pulley is fast. The driver can be on either piece.

C is a friction-piece or block.

D is an eccentric that turns on the pin z. Upon the eccentric is a block, y, shaped to assist the curve of the eccentric on one side; the other side flat.

X is a set-screw, whose nut is in the stem of the friction-block C.

E is a sliding arm that moves freely on the main shaft A, in the prolonged hub of which is a groove to receive the crotch-end of the long lever F, and W is the connecting-link between the sliding arm E and the lever-end of the eccentric, D.

As in such clutches the friction of necessity wears away both the inner rim of the pulley and the outer surface of the block C, slight adjustment of distance by the set-screw X will at any time insure the turn of the eccentric to bring the line of pressure between the pin z and the screw X to just that point, to and from which it is the most easily removable by the operation of the combined leverage of F, E, w, and D, and thus the starting and stopping of large pulleys with wide belts can be effected with more facility by less power than can be done where there is no provision for a maintenance of the exact distance that is constantly varying from wear and tear of the parts, which in this class of clutches is very great.

By thus preserving the line of pressure, it can stand at an easily removable point without that continually jarring loose so annoying to the workmen, to which other clutches are liable from wear.

What I claim as my improvement, and desire to secure by Letters Patent, is—

The set-screw X, when employed in a friction-clutch, substantially in the manner and for the purposes specified, the nut being in the stem of the block C.

The sliding arm E, link w, and eccentric, D, in combination with the adjustable block C, when constructed, combined, and arranged in the manner and for the purpose hereinabove set forth.

CHARLES WRIGHT.

Witnesses:
 W. M. GOODING,
 SIDNEY U. EDWARDS.